United States Patent Office 3,481,000
Patented Dec. 2, 1969

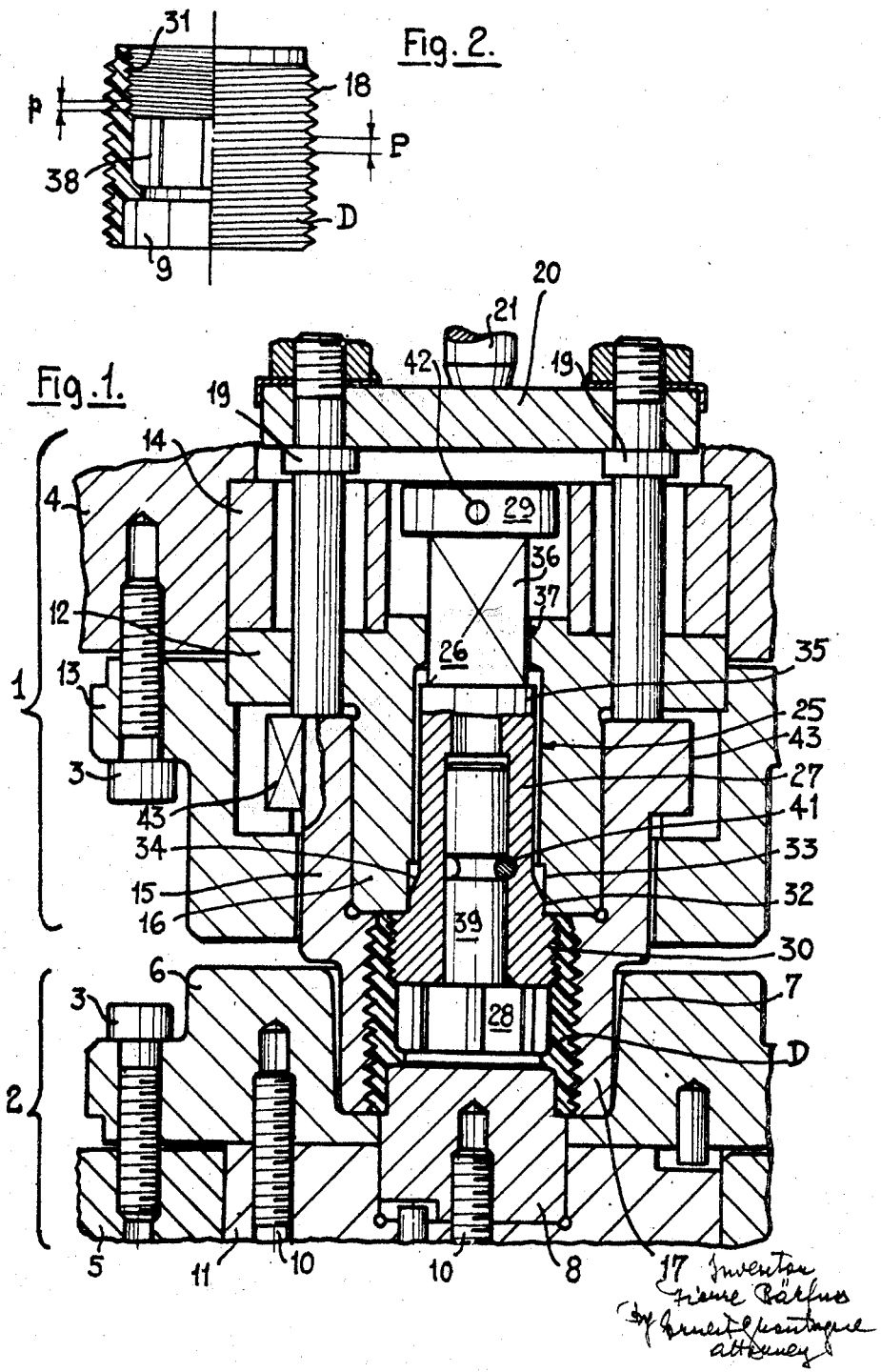

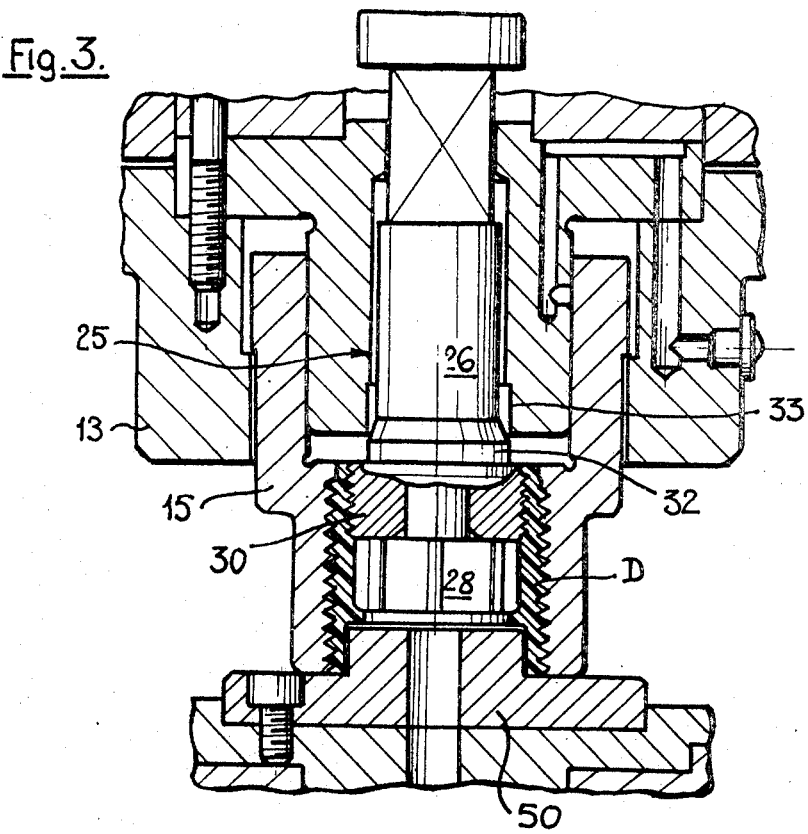
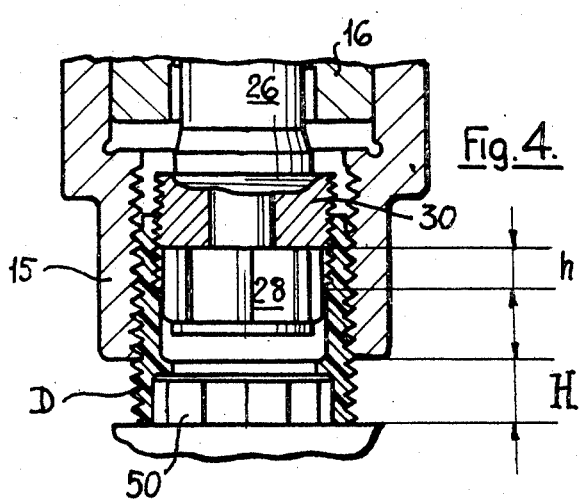

3,481,000
MOULDING PRESSES
Pierre Bärfuss, Tavannes, Switzerland, assignor to Tavannes Machines Co. S.A., Tavannes, Switzerland, a corporation of Switzerland
Filed Sept. 20, 1967, Ser. No. 669,096
Claims priority, application Switzerland, Sept. 22, 1966, 13,701/66
Int. Cl. B29c 3/00
U.S. Cl. 18—16                            7 Claims

ABSTRACT OF THE DISCLOSURE

A moulding press for moulding articles of thermosetting material having coaxial external and internal threads, comprises a mould in two portions each secured to a plate of the press. One portion of the mould includes a central core and a casing therearound respectively for forming the internal and external threads of an article. The core is supported during moulding in a bore of a support body at two axially spaced locations by a cylindrical collar and a portion of polygonal section fitting in corresponding portions of the bore. On opening of the mould the core is moved to disengage the collar from the bore and, since clearance is provided between the polygonal portion remaining in the bore and the bore, the core assumes a floating condition facilitating the removal of a moulded article by a rotatable key engageable therewith.

BACKGROUND OF THE INVENTION

The moulding of articles made of thermosetting material and having coaxial external and internal threadings of the same or different pitches poses a problem with regard to the removal of such articles from the mould for which various solutions have been proposed.

In one known mould, a casing whose internal wall bears the impression of the external threading of the article is formed from several segments assembled by a conical clamping ring. Moving this ring from a clamping position to a releasing position after moulding causes separation of the segments so as to release the exterior of the article. The article can then be unscrewed from a core bearing the impression of the internal threading.

This has the disadvantage that the manufacture of the threaded casing made of several segments is troublesome and the proper operation of the mould may be disturbed by dust finding its way between the segments. Further, the separation plates of the segments leave projecting rough edges on the article produced which spoil the appearance of the article and may be a disadvantage when the latter is used.

In another known mould, the central core bearing the impression of the internal threading is disposed rotatably and slidably with respect to a casing bearing the impression of the external threading. On removal from the mould, the article is unscrewed from the casing, while the core rotating with the article moves axially with the latter, and then the article is unscrewed from the core. The article may also be unscrewed simultaneously from the casing and the core, the latter moving axially where appropriate during this operation as a result of the differences between the pitches of the internal and external threadings.

In the known moulds of this second type, the core disposed slidably with respect to the casing is constantly held centered with respect to the latter. This permanent centering is a major disadvantage, since it is practically impossible to ensure perfect concentricity between the outer and inner elements of the mould, and a slight error of concentricity causes the wall of the article to vary in thickness. On the unscrewing of the article, a part of the wall that is a little too thick must therefore pass through the portion of the mould that has formed the over-thin opposite wall. This causes a considerable braking effect to be exerted on the rotational movement of the article, and may tear it, in which case the mould must be dismantled to remove the remains. Automatic operation cannot, therefore, be ensured.

SUMMARY OF THE INVENTION

This invention aims to provide a moulding press comprising moulds of simple manufacture, which are free from the above-mentioned disadvantages. An object of the invention is to obtain a high degree of operational reliability, so that the press can operate automatically at a high rate.

Accordingly the invention provides a moulding press for the moulding of articles made of thermosetting material and having coaxial external and internal threads, comprising a pair of press plates supported for relative motion, at least one mould between said plates adapted to be closed and opened by relative movement of said plates, a central core in said mould carrying an impression of the internal thread to be produced in said articles and an outer casing surrounding said central core carrying an impression of the external thread to be produced on said articles, said core and said casing defining a moulding cavity therebetween and being relatively movable in an axial direction to permit of unscrewing a moulded article from said core and said casing by a rotatable key engageable with said article, wherein the improvement comprises centering means in said mould operable in the closed position of said mould to hold said core and said casing in coaxial relationship during the moulding of said article, said centering means being rendered inoperative in the open position of said mould to enable said core and said casing to move radially relative to each other during unscrewing of said article.

DESCRIPTION OF THE DRAWINGS

For a better understanding of the invention reference may now be had to the appended drawings, in which:

FIGURE 1 shows an axial section of a mould of a press embodying the invention in the closed position at the end of the moulding of a threaded sleeve made of thermosetting material;

FIGURE 2 is a view of the threaded sleeve produced half in axial section;

FIGURE 3 is an axial section showing the open mould, the moulded sleeve being engaged by a rotating key for unscrewing it from the top of the mould, this section being made in a plane perpendicular to the plane of the section in FIGURE 1;

FIGURE 4 is a partial view of the mould illustrating the operation of unscrewing the sleeve.

DESCRIPTION OF THE PREFERRED EMBODIMENT

As shown in the drawings a moulding press comprises a mould, illustrated in FIGURE 1, adapted for moulding a sleeve D.

The mould of FIGURE 1 comprises a top mould portion 1 and a bottom mould portion 2 secured by bolts 3 to a top plate 4 and a bottom plate 5 of the press respectively.

The bottom mould portion 2 comprises a body 6 having a central cavity 7 forming a compression chamber. The cavity 7 has a centrally disposed die 8 for moulding a bottom part 9 (FIGURE 2) of the bore of the sleeve D (FIGURE 2). Screws 10 secure the body 6 and the die 8 to a bed 11 bearing on the bottom plate 5.

The top mould portion 1 comprises a support member 12 held between a cover 13 and a bed 14 bearing on the top plate 4. The bottom end of a casing 15 has an annular portion 17 formed with a threaded bore for moulding an external thread 18 of the sleeve D. The top end of the casing 15 is in contact with two rods 19 threaded to a cross-bar 20 adapated to cooperate with a push-rod 21 of a hydraulic extracting mechanism (not shown). In the top position, shown in FIGURE 1, a bottom shoulder of the casing 15 abuts on the end of a nose 16 of support member 12.

A bore 25 of the nose 16 receives a die 26 comprising a body 27, a head 28 and a thrust ring 29. The bottom end of the body 27 has a threaded collar 30 adapted for moulding an internal thread 31 of the sleeve D. The threaded collar 30 is followed by a cylindrical collar 32 fitted in a cylindrical portion 33 of the bore 25. A cone 24 behind the collar 32 is extended to form a cylindrical portion 35 and a portion of square section 36 guided in a rear portion 37 of the bore 25.

The fitting of the square portion 36 of the body 27 in the square section portion 37 of the body 12 prevents the body 27 of the die 26 from rotating with respect to the body 12. The square portion 36 has a lateral clearance of about 0.25 mm. within the bore 25.

The head 28, adapted for moulding a grooved middle portion 38 of the cavity of the sleeve D, has a tail 39 received by an axial hole in the body 27. A pin 41 engaging in a groove of the body 27 secures the head 28 axially to the body without opposing its rotation with respect to the latter.

When the sleeve D is being moulded, the two mould portions 1 and 2 are brought into cooperation in the position shown in FIGURE 1, the moulding proper being carried out conventionally. That is to say, the material is transformed by heat and pressure and completely fills the cavity of the form defined between the casing 17 and the core formed by the bottom portion of the die 26 and by the die 8.

In the closed position of the mould (FIGURE 1), the die 26 is positioned radially and exactly with respect to the body 12 as a result of the engagement of its axially spaced collars 32 and 36 in the portions 33 and 37 and of the bore 25. The casing 15 is also positioned radially with respect to the body 12 by its fitting on the nose 16 of the latter. The annular moulding cavity is thus defined between concentric elements, so that the thickness of the wall of the sleeve D will be relatively regular apart from fitting clearances.

When the sleeve D has been formed, the mould is opened by the axial withdrawal of the mould portion 2, the bottom die 8 being withdrawn from the cavity 9 of the sleeve D.

In order to extract the moulded sleeve D from the top mould portion 1, a rotating key 50 (FIGURE 3) is disposed to take the place of the bottom mould portion 2, as a result of an indexing movement of the bottom plate 5 for example.

Before the height-adjustable rotating key 50 engages in the moulded sleeve, the push-rod 21 of the extractor is lowered, so as to bring the casing 15, the moulded sleeve D and the die 26 into a bottom position, shown in FIGURE 3.

During this movement, the collar 32 of the die 26 is disengaged from the portion 33 of the bore 25, so that the lower end of the die 26 is no longer suported radially and becomes floating, since there is clearance between the top square 36 and the body 12.

The key 50 is then engaged with the sleeve D and rotated to unscrew the sleeve D from the casing 15, which is prevented from rotating by ribs 43 engaging in grooves of the cover 13.

During this movement, the sleeve D is also unscrewed from the threaded head 30 of the die 26, which is prevented from rotating by the square section portion 36.

As the internal thread 31 of the sleeve has a smaller pitch than its external thread 18, the downward movement of the sleeve D is accompanied by a movement in the same direction of the die 26, as shown in FIGURE 4.

In FIGURE 4, the sleeve D is shown after it has rotated four turns with respect to the top mould portion. It is then unscrewed from the casing 15 by a length H corresponding to four times the pitch P of the thread 18. During this movement, the die 26 is unscrewed from the sleeve D by a length $h$ corresponding to four times the pitch $p$ of the thread 31. The die 26 is, therefore, lowered by an amount corresponding to the difference between these two lengths H and $h$.

The key 50 is rotated until the sleeve D is completely unscrewed from the top mould portion 1, which is then returned to the moulding position by a new indexing movement.

The bottom mould portion 2 is then filled with a new charge of material, and, on the closure of the mould, the pressure necessary for forming the article returns the moving elements of the top mould portion 1 to their moulding position as shown in FIGURE 1. During the raising of the die 26, the conical collar 34 guides the latter in the recess 33.

As a result of the disengagement of the bottom guiding of the die 26, the head 28 of the latter is made floating during the unscrewing of the sleeve D, so that if the die 26 should be out of centre with respect to the outer casing 15, this will not impede the removal of the sleeve.

The moulding press shown and described has the following adavntages:

(a) The external and internal thread 18 and 31 of the sleeve D are moulded in contact with monolithic elements, preventing any burrs on the screw pitches.

(b) The centring of the die 26 on the cylindrical collar 32 obviates the pressures characteristic of cones, thus also reducing the risk of fouling the centering collar.

(c) The floating position of the head 28 during unscrewing a moulded sleeve prevents any undue pressure on and any accidental tearing of the wall of the sleeve. A higher rate of removal from the mould can be achieved, since the mould operates very reliably and there are therefore no unproductive periods occasioned by the removal of the remains of broken sleeves.

(d) The degree of precision of the mould, particularly the elements comprising the thread, does not need to be very high, since the ease of removal from the mould is independent of good centering of the members.

(e) Similarly, deformations of the mould elements resulting from wear, temperature variations or any other causes have practically no effect on the operation or reliability of the mould and of the sleeve-extracting means.

In a variant, the thread of the die 26 may have a greater pitch than that of the casing 15. The axial movement of the die with respect to its guide must then be enough to allow the die to move backwards with respect to the casing during the unscrewing of the sleeve.

The mould shown may also be adapted for moulding articles of other shapes, comprising in particular several internal threads of the same pitch and one or several external threadings of another pitch different from the first.

I claim:

1. A moulding press for the moulding of articles made of thermosetting material and having coaxial external and internal threads, comprising a pair of press plates supported for relative motion, at least one mould between said plates adapted to be closed and opened by relative movement of said plates, a central core in said mould carrying an impression of the internal thread to be produced in said articles, and an outer casing surrounding said central core carrying an impression of the external thread to be produced on said articles, said core and said casing defining a moulding cavity therebetween and being relatively movable in an axial direction to permit of unscrewing a moulded article from said core and said casing by a rotatable key engageable with said article, wherein the improvement comprises centering means in said mould operable in the closed position of said mould to hold said core and said casing in coaxial relationship during the moulding of said article, said centering means being rendered inoperative in the open position of said mould to enable said core and said casing to move radially relative to each other during unscrewing of said article.

2. A press as claimed in claim 1, in which said core comprises a die carrying the impression of the internal thread, a support body is rigidly secured to one plate of the press and has a bore receiving said die for axial movement relative thereto, and said centering means include a cylindrical collar on said die engaging in a complementary cylindrical portion of said bore in a withdrawn position of said die in the closed postion of said mould, said collar being released from said bore in an advanced position of said die in the open position of said mould.

3. A press as claimed in claim 2, in which said die is provided with a conical portion adjacent said cylindrical collar to facilitate the engagement of said collar in said complementary portion of said bore.

4. A press as claimed in claim 3, in which said support body includes a nose on which said outer casing of said mould is slidably disposed, and said press includes means for advancing said casing relative to said nose on opening of said mould, said die being brought from its withdrawn to its advanced position, during the advancing movement of said casing, due to the threaded engagement of the moulded article with said casing and said die 5. A press as claimed in claim 4, in which said die includes a portion of polygonal section axially spaced from said cylindrical collar and adapted to engage in a correspondingly formed portion of sad bore in said support body in both the withdrawn and advanced positions of said die.

6. A press as claimed in claim 5, in which said die includes a unitary body formed with said cylindrical collar and said portion of polygonal section said body further including a portion bearing the impression of the internal thread forwardly spaced from said collar and said portion of polygonal section in the direction of advancement of said die.

7. A press as claimed in claim 6, in which said die comprises a head rotatably mounted with respect to said unitary body forwardly disposed from said threaded portion of said body.

References Cited

UNITED STATES PATENTS 2,363,808 11/1944 Sayre.
2,408,630 10/1946 Green.
2,899,705 8/1959 Darlington.
2,984,862 5/1961 Chabotte.

J. HOWARD FLINT, Jr., Primary Examiner

U.S. Cl. X.R.

18—2